(No Model.)

P. N. BARDO & T. FORD.
COOLER FOR MASH AND OTHER LIQUIDS.

No. 270,367. Patented Jan. 9, 1883.

UNITED STATES PATENT OFFICE.

PETER N. BARDO AND THOMAS FORD, OF NEWPORT, KY., ASSIGNORS TO THE BOURBON COPPER AND BRASS WORKS, OF CINCINNATI, OHIO.

COOLER FOR MASH AND OTHER LIQUIDS.

SPECIFICATION forming part of Letters Patent No. 270,367, dated January 9, 1883.

Application filed August 5, 1882. (No model.)

*To all whom it may concern:*

Be it known that we, PETER N. BARDO and THOMAS FORD, citizens of the United States, and residing at Newport, Campbell county, Kentucky, have invented a certain new and useful Improvement in Coolers for Mash and other Liquids; and we do hereby declare that the following is a full, clear, and exact description of the same.

Our invention consists in a series of boxes or troughs, arranged one above another, carrying coils of pipe, through which the liquid to be cooled passes, and which are cooled by water constantly flowing through the boxes; secondly, in so arranging these troughs or boxes that either may be readily emptied and cleaned without disconnecting any of the parts or moving the pipes.

Figure 1:
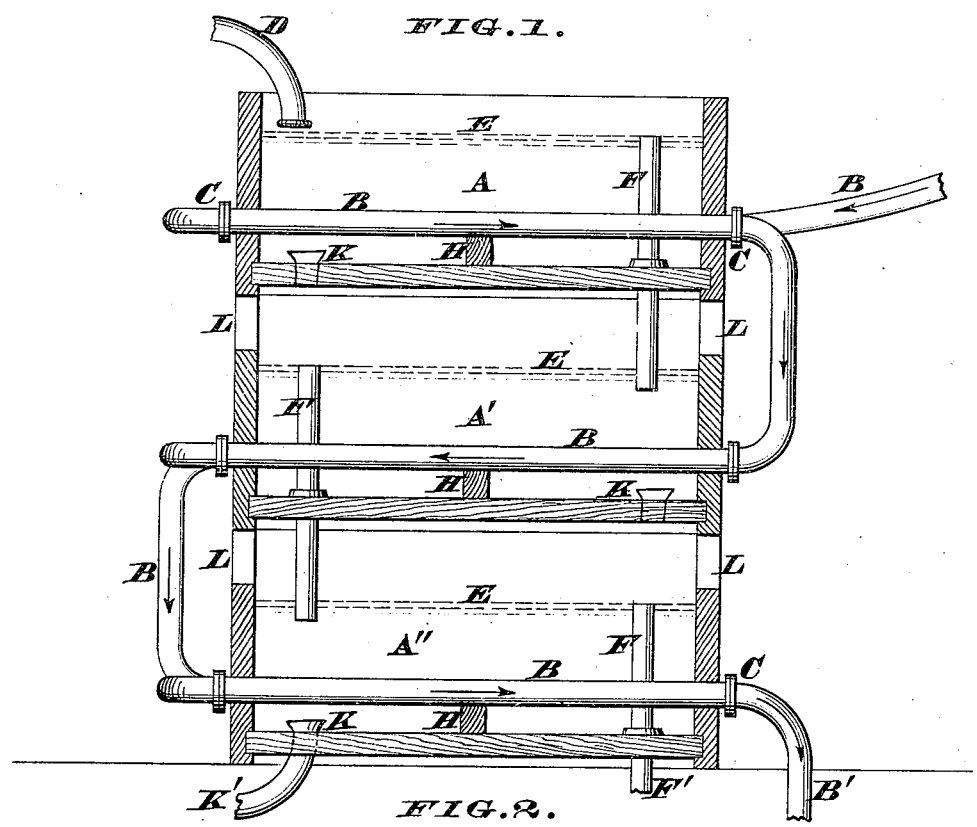
Figure 2:
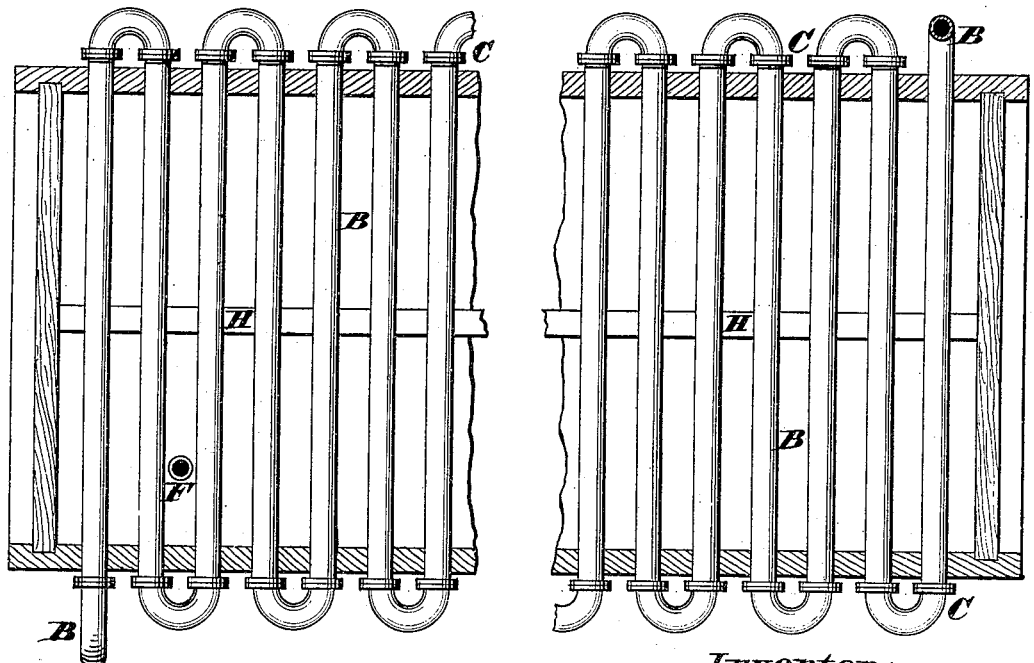

Figure 1 is an end section of my cooling device, showing three troughs; Fig. 2, a plan view, in section, of the bottom of one of the troughs and the coil of pipe.

Any convenient number of boxes may be used, one above the other.

A is the upper box; A' and A'', the second and lower ones.

B is the pipe for the malt or beer, which enters the upper box near one end and is coiled across the box to the other end, as shown in Fig. 2. In the drawings the turns of the coil of the pipe are carried outside of the box, and are made with an ordinary flange-joint, C.

If desired, the coil may be made entirely in the box. The only advantage of carrying them outside is that they are more easily cleaned should they become clogged from any cause, which is done by unscrewing the joint and inserting a hose and forcing a strong stream of water through; or, if necessary, a rod may be inserted and obstacles removed. The pipe B, having passed entirely through the upper box, is carried down and enters the one below, where it is again coiled, as in the first one, and again carried down to the next lower box until it reaches the bottom one, and then discharges at B' into the fermenting-tub or any reservoir arranged to receive it.

D is the water-pipe, admitting water to the upper box, A'. The boxes are not filled to the top. The dotted lines $e\ e$ indicate the water-line in each box. The bottoms of these boxes are made with a slight incline from end to end, the incline of each box being in the opposite direction from the one above, and at the lower end of each is provided with an overflow-pipe, F. When the upper box is filled to the proper height the water overflows and is carried by the overflow-pipe F to the box below. This pipe F extends down below the water-line of the box, to which it conveys the water, so as to prevent any splash. By this means a constant flow of fresh water is kept passing through the boxes and passing out into a waste-pipe at F'. As the mash or other liquid passes slowly downward through the coiled pipe, which may be made of any length, according to the size and number of boxes used, it is constantly under the stream of water flowing through the boxes and is rapidly and thoroughly cooled.

H H are blocks upon which the middle of the sections of pipe are supported, and K K are plugs in the bottom of each box, which are ordinarily kept closed. There is an open space of about twelve or fifteen inches left between each of these boxes, as shown at L L. This space is desirable for two purposes: It permits any steam which may be formed by the heat of the pipes to pass off readily, and permits a free circulation of air over the water in each box, thus carrying off their heat and keeping the water cooler; second, when any of the boxes or coils of pipe need cleaning it is unnecessary to displace any parts of the cooler. The flow of water from the pipe D being stopped, and the plug K being taken out of any one of the boxes, it immediately empties into the box below, and the box and coil of pipes are exposed for cleaning, which can be done by a broom and hose; or a man can get into the box for that purpose. The plug K of the bottom box closes a waste-pipe, K'.

If desirable, the mash may be pumped into the pipe B from below, thus making the current of water and mash meet moving in opposite directions; but we do not claim this specifically, as it is old.

The shape of the boxes may be varied according to circumstances and location. A series of round tubs may be used, when the pipes will be coiled in a circle near the bottom of each tub, instead of across, as shown in the drawings.

We do not claim broadly a series of water-tanks arranged one above the other with spaces for air between them.

Having described our invention, what we claim is—

1. A cooler for mash or other liquids, consisting of a series of water boxes or troughs arranged one above another, with an open space between the boxes, in combination with a coil of pipe carrying the mash through each box, as and for the purpose described.

2. The above-described cooling device, provided with the overflow-pipes F F, so arranged that there shall be a constant quantity of water in each box and a continuous flow through them all, in combination with the coil of pipe, as and for the purpose described.

3. A cooling device for malt, consisting of a series of troughs or boxes so arranged that there may be a constant flow of water through them, in combination with the pipe carrying the mash, and so disconnected or separated that any one may be emptied and cleaned without disarranging any of the parts.

4. In a cooling device, the pipe carrying the liquid to be cooled, coiled through a series of water-boxes arranged one above the other, containing a constant supply of flowing water, and so arranged that this pipe may be opened at any point for cleaning it internally without removing it from the box or displacing any other parts.

PETER N. BARDO.
THOMAS FORD.

Witnesses:
GUS. A. MEYER,
DANIEL KELLY.